United States Patent [19]

Munch et al.

[11] Patent Number: 5,082,336

[45] Date of Patent: Jan. 21, 1992

[54] CONTROL CABINET WITH A CABINET DOOR

[75] Inventors: Udo Munch, Sinn; Jurgen Zachrei, Dillenburg-Nanzenbach, both of Fed. Rep. of Germany

[73] Assignee: Rittal-Werk Rudolf Loh GmbH & Co. KG, Fed. Rep. of Germany

[21] Appl. No.: 579,624

[22] Filed: Sep. 7, 1990

[30] Foreign Application Priority Data

Sep. 9, 1989 [DE] Fed. Rep. of Germany ....... 3930188

[51] Int. Cl.$^5$ .............................. A47B 97/00
[52] U.S. Cl. .................... 312/292; 312/242; 49/401
[58] Field of Search ............ 312/214, 242, 292, 321.5, 312/291, 293; 49/163, 168, 169, 400, 401, 504

[56] References Cited

U.S. PATENT DOCUMENTS

| 491,641 | 3/1990 | Brossardt . | |
|---|---|---|---|
| 492,867 | 3/1990 | Brossardt . | |
| 1,023,425 | 4/1912 | Harrison | 312/242 |
| 1,320,392 | 11/1919 | Hirschman | 312/242 |
| 3,054,212 | 9/1962 | Morris | 312/242 |
| 3,854,248 | 12/1974 | Dayers | 49/504 |
| 4,810,025 | 3/1989 | Riley | 49/400 |
| 4,816,966 | 3/1989 | Frankowski . | |

FOREIGN PATENT DOCUMENTS 2847994 11/1984 Fed. Rep. of Germany .
8907155 12/1989 Fed. Rep. of Germany .

OTHER PUBLICATIONS

Hoffman Company Brochure, custom enclosure.
Schroff, Inc., Catalog (German).
SSI Schafer, Catalog (German).

Primary Examiner—James R. Brittain
Assistant Examiner—Gerald A. Anderson
Attorney, Agent, or Firm—Speckman & Pauley

[57] ABSTRACT

The invention relates to a control cabinet with a cabinet door in which a cutout has been provided, which cutout is enclosed by a cover. To obtain more space for additional assemblies in the area of the cutout of the cabinet door, the invention comprises a frame connected to a trough-like insert placed in the cutout of the cabinet door. The frame has a connecting section on the outside of the cabinet door which covers the edge area of the cabinet door adjoining the cutout and connects to a U-shaped closure frame which is open in the direction of the cabinet door. A cover is pivotally seated in the area of the lower horizontal edge of the insert, and can be brought into and maintained in a horizontal position by means of cover hinges or cover stops. The cover can be fastened by means of a closure element in a closed position which covers the open end of the insert.

8 Claims, 5 Drawing Sheets

CONTROL CABINET WITH A CABINET DOOR

BACKGROUND OF THE INVENTION

1. Field of the Invention

The invention relates to a control cabinet with a cabinet door having a cutout covered by a frame.

2. Description of the Prior Art

German Patent DE-PS 28 47 994 teaches a frame around a cutout which functions as a retainer for a window pane. The frame may be connected with a support tray, on which operating elements may be fastened. However, the space available for built-in operating elements is very small, because the frame should not extend too far from the cabinet door.

SUMMARY OF THE INVENTION

It is the object of the invention to design a control cabinet of the above mentioned type in such a way that considerably more space for housing additional elements becomes available in the area of the cutout without having to build excessively far beyond the cabinet door.

This object is attained in accordance with the invention which is comprised of a frame connected to a trough-shaped insert set into a cutout in a cabinet door. The frame has a connecting section which covers the area on the outside of the cabinet door adjoining the cutout and connects on the outer side of the frame to a U-shaped closure frame which is open towards the cabinet door. In the area of the lower, horizontal edge of the insert, a cover is pivotably seated which can be brought into a horizontal opened position by means of cover hinges or cover stops and maintained there. The cover can be fastened by means of a closure element in a closed position, covering the open side of the insert.

For all practical purposes, the insert with the closable cover constitutes a small cabinet built into the cabinet door, which can contain considerably more elements and can be used by itself as a support tray for built-in operating elements and where the cover in the open position not only allows access to the built-ins, but can be used by itself as a support for objects to be set down on it.

In accordance with one embodiment of the invention, the frame is connected in one piece to the insert and preferably is beveled.

When the insert is fit into the cutout of the cabinet door, the connecting section is fixedly connected to the cabinet door, for example screwed to it.

In accordance with another embodiment, the connecting section of the frame has a sealing element on the outside and a further sealing element is inserted into the closure frame. Consequently, the insert is tightly fastened in the closed position of the cover and the frame is also sealed tightly towards the cabinet door.

In yet another embodiment, when the opened cover is used as a work station, for example for putting down a keyboard, the upper sidewall of the insert is inclined in such a way that the inside becomes larger towards the open side of the insert and a lighting arrangement for illuminating the space above the opened cover is built into the upper sidewall.

Securing the objects placed on the opened cover is simply attained where the cover has on its inside a circumferential bevel as a holder for the objects placed on the cover, such as a keyboard.

To operate the cover in accordance with a further embodiment of the invention, the cover has a preferably beveled operating ridge on the outside along the edge opposite from the hinged side. A visually pleasing fit of the cutout in the cabinet door is attained where the closure frame has a first section extending vertically to the cabinet door which connects to a second section extending parallel to the cabinet door. The closure frame is closed towards the exterior by an inclined third section oriented towards the cabinet door, which increases the width of the closure frame in the direction towards the cabinet door. The cover is rotatably seated in the closure frame with its side adjoining the hinged side, and in the closed position, its ends flush with the section of the closure frame which extends parallel to the cabinet door. The invention will be described in detail by means of various exemplary embodiments shown in the drawings.

DETAILED DESCRIPTION OF THE PREFERRED EMBODIMENTS

Figure 1:
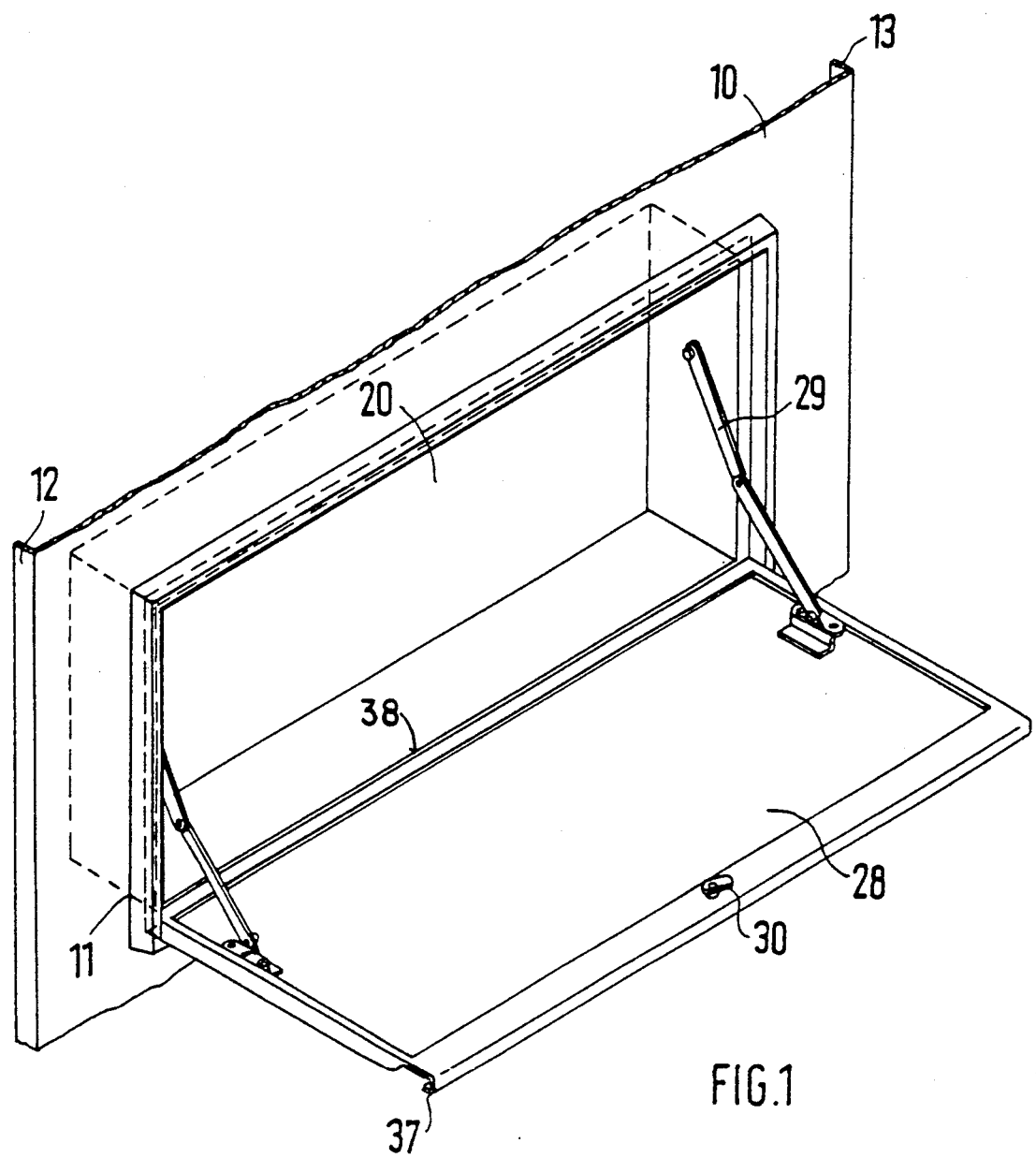
FIG. 1 is a perspective view of a trough-like insert which can be closed with a cover and which is built into a corresponding cutout in a cabinet door of a control cabinet.

In FIG. 1, only a portion of the cabinet door 10 is visible in which a rectangular cutout 11 has been made. The vertical edges of the cabinet door 10 are braced by bevels 12 and 13. The trough-shaped insert 20 has been placed into the cutout 1 of the cabinet door 10 and extends into a peripheral frame, not particularly identified, in the area of the open side. The cover 28 is pivotably connected with the insert 20 in the area of the hinged side 38. The cover 28 is maintained in the horizontal, open position on both sides by each one of two cover hinges 29, made of two levers flexibly connected with each other, and when open, it can be used as an auxiliary work station or storage tray. The side of the cover 28 opposite the hinged side 38 is beveled towards the exterior to form an operating ridge 37 and is provided with the closure element 30, which maintains the cover 28 in the closed position in which it closes the open side of the insert 20 flush with the frame. The height of the frame has been purposely kept low, so that the assembly does not protrude excessively.

The depth of the insert 20 is geared to the space requirements of the elements to be built in or placed inside and to the built-ins inside the control cabinet, which must be maintained a required distance from the back of the insert when the cabinet door is closed.

Figure 2:
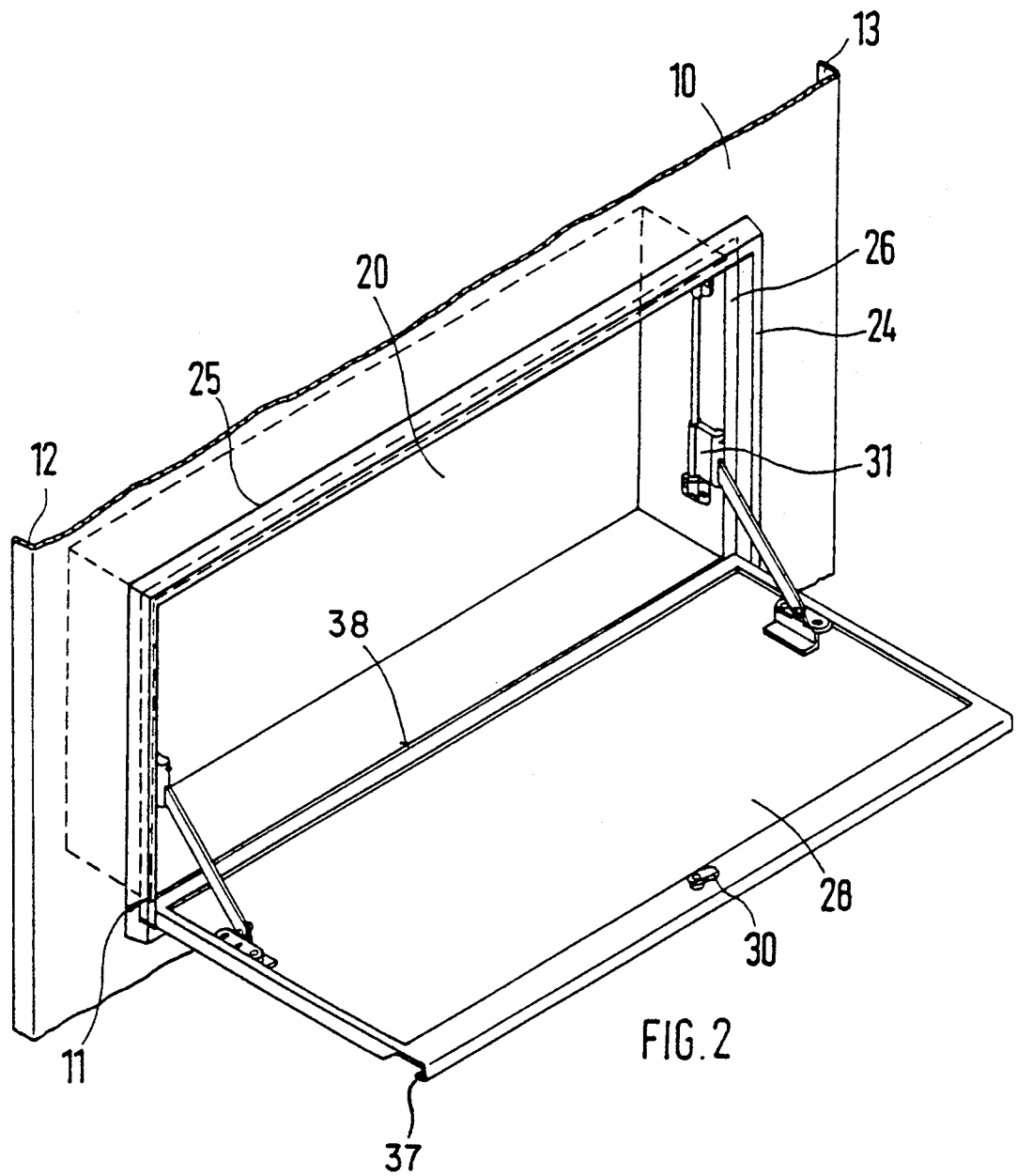
FIG. 2 is a perspective view of an insert with a cover which, in contrast to FIG. 1, is supported with cover stops instead of with cover hinges.

In the exemplary embodiment in accordance with FIG. 2, two cover stops 31 for maintaining the cover 28 have been provided instead of the cover hinges 29. Cover stops, the braking power of which can be adjusted, are preferably used, so that the downward movement of the cover 28 with the elements fastened thereon can be adjusted.

Figure 3:
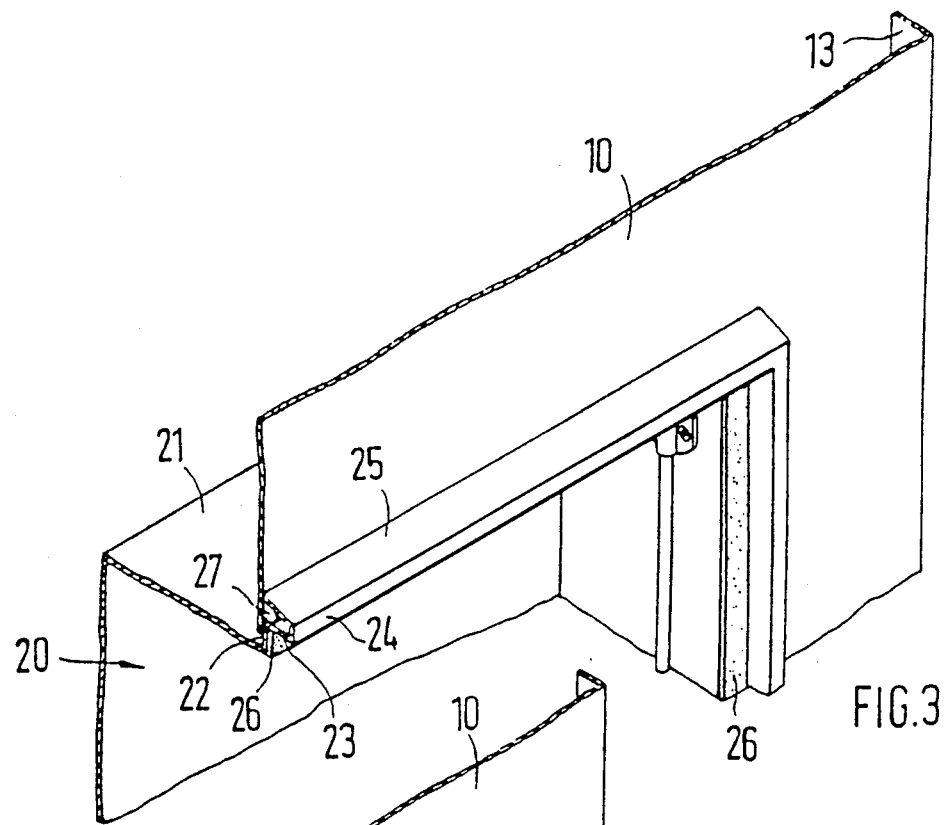
FIG. 3 is a perspective, enlarged view of a cutout, which shows the design of the frame formed on the insert and the seal.

The enlarged partial view in accordance with FIG. 3 shows the design of the frame beveled on the insert. First, the outwardly facing connecting section 22 is connected on one side to the open side of the insert 20 and on its other side to the closure frame consisting of sections 23, 24 and 25, which faces forward and opens towards the cabinet door 10. The connecting section 22 and the section 24 extend parallel to the cabinet door 10, while the section 23 extends vertically to it. The section 25 is inclined in such a way that it increases the width of the U-shaped closure frame in the direction towards the cabinet door 10. The sealing element 26, which provides the seal between the cover 28 and the insert 20 in the closed position of the cover 28, is disposed on the side of the connecting section 22 away from the cabinet door. The connecting section 22 is fixedly connected to the are around the edges of the cutout 11 of the cabinet door 10, for example by screws, which connection is made prior to the application of the sealing element 26. The open closure frame with the sections 23 24 and 25 contains the further sealing element 27, which provides the seal between the closure frame and the cabinet door 10.

Figure 4:
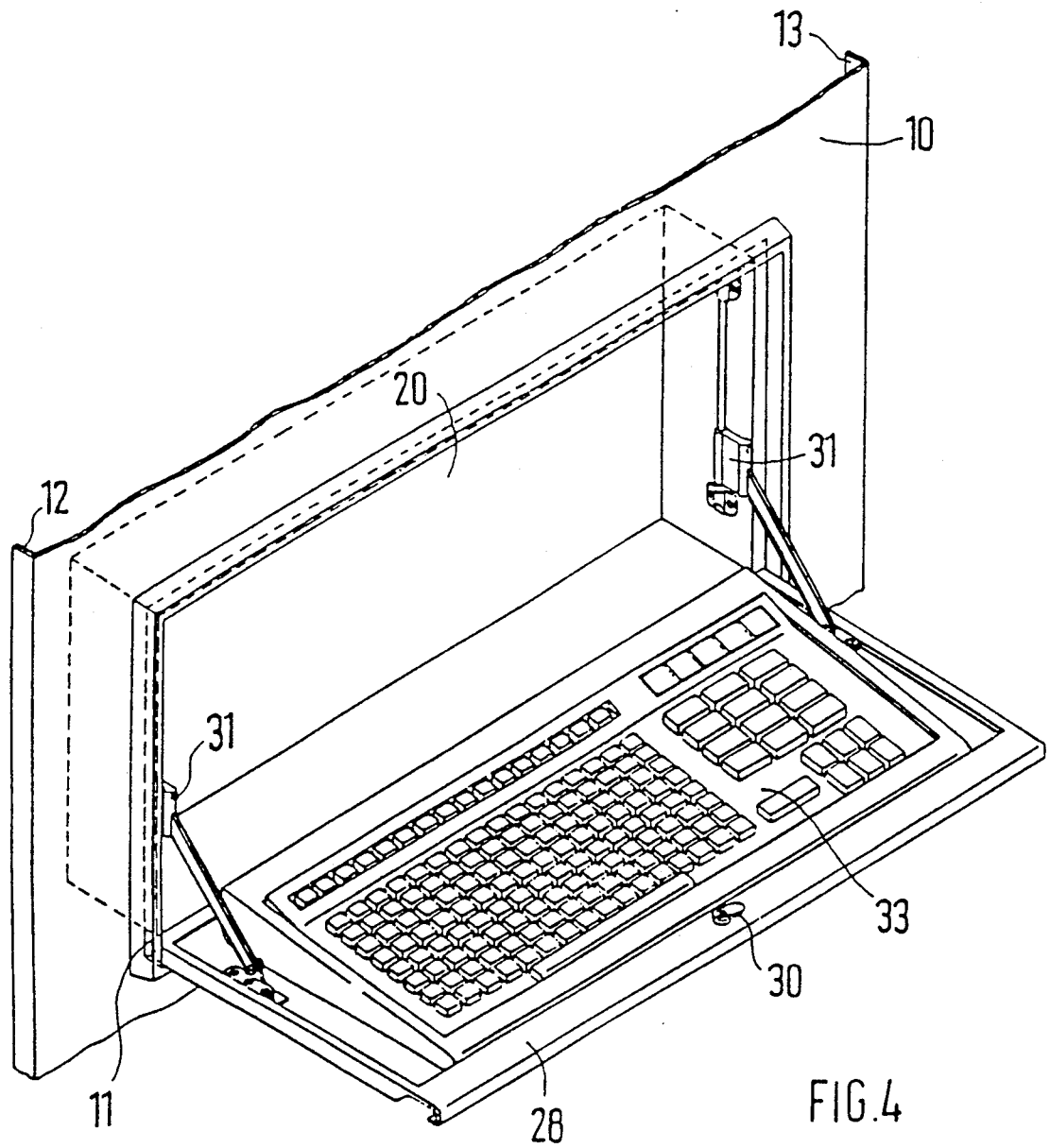
FIG. 4 is a perspective view of the insert in accordance with FIG. 2 with a cover with a keyboard resting thereon.

FIG. 4 shows a beveled receptacle on the inside of the cover 28 in which, for example, a keyboard 33 can be kept. If the keyboard 33 is additionally connected to the cover 28 it is possible to put it, together with the cover 28, in the closed position in which it is received by the insert 20. It is possible to run the connecting cables of the keyboard 33 from the insert 20 into the control cabinet through cable ducts known per se.

Figure 5:
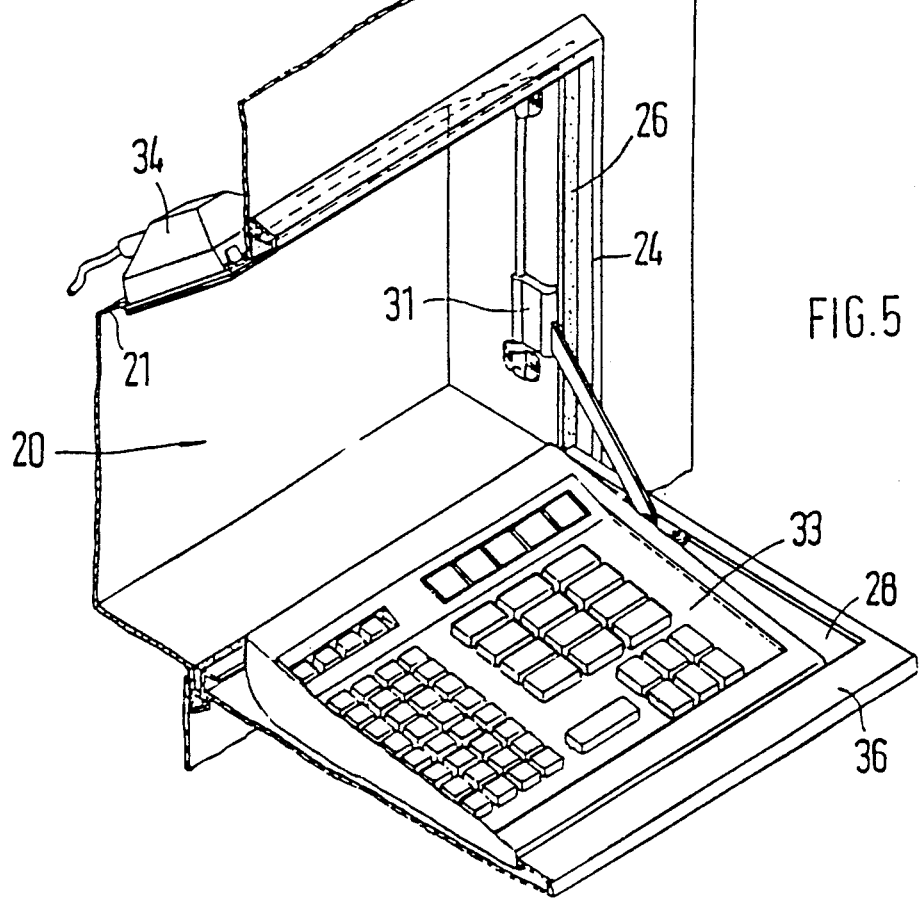
FIG. 5 is a perspective partial view with an insert in another design, which can be illuminated.
Figure 6:
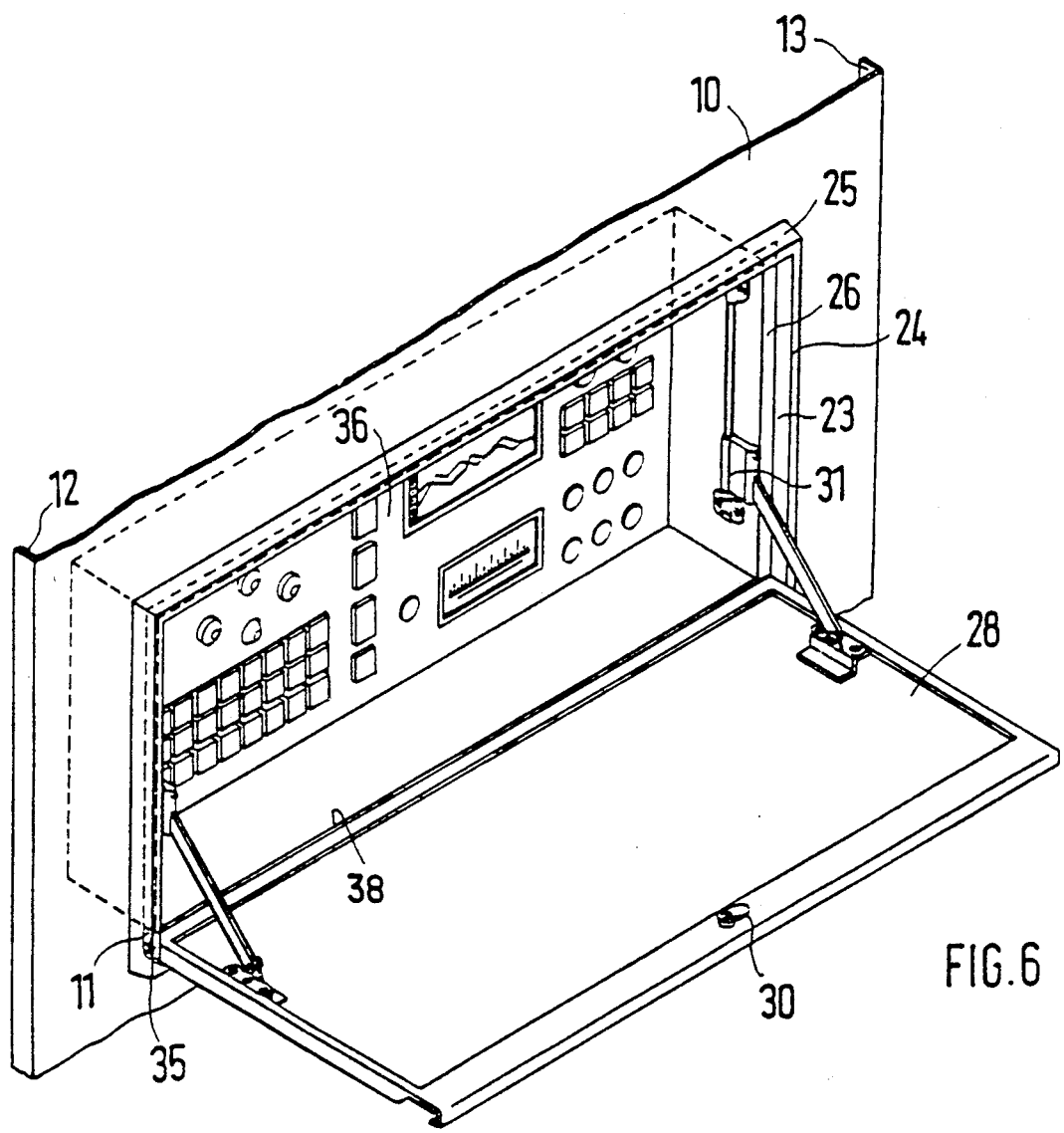
FIG. 6 is a perspective view of an insert which is used as a support for operating elements, etc., and which can be closed by means of the cover.

As illustrated by FIG. 5, the upper sidewall 21 of the insert 20 may be inclined in such a way, that the interior space of the insert 20 is enlarged towards the open end. In this case the lighting arrangement 34 can be installed in the sidewall 21 in such a way that the keyboard 33 placed on the opened cover 28 in the receptacle formed by the bevels 36 is illuminated. Finally, FIG. 6 shows an exemplary embodiment in which the bottom of the insert 20 is used as a support tray for operating elements, etc. When used in this manner, the depth of the insert 20 may also be reduced. FIG. 6 furthermore shows that the cover 28 is rotatably seated in the closure frame sections 23 with the sides adjoining the hinged side 38, so that in the closed position it closes flush with the closure frame sections 24. The closure element 30 may be a simple turnbuckle closure, which can be turned by means of an operating element and which is inserted into a cutout in the frame.

We claim:

1. A control cabinet with a cabinet door having a cutout covered by a frame, comprising;
    said frame connected in one piece to a trough-shaped insert (20) set into said cutout (11) in said cabinet door (10);
    said frame having a connecting section (22) fixedly connected to said cabinet door (10) and covering an area of an outside surface of said cabinet door (10) adjoining said cutout (11);
    a first sealing element (26) on a side of said connecting section (22) facing away from said cabinet door (10);
    a U-shaped closure frame (23, 24, 25) having an open side facing said cabinet door (10) connected to said connecting section;
    a second sealing element (27) inserted into said open side of said U-shaped closure frame (23, 24, 25);
    a cover (28) pivotably seated at a hinged side (38) of said insert (20) which can be brought into a horizontal opened position by one of at least one cover hinge (29) and at least one cover stop (31) and maintained in said horizontal opened position;
    said cover (28) having on an inside of said cover (28) a circumferential bevel (36) forming a holder for objects placed on said cover (28); and
    said cover (28) being fastened by a closure element (30) in a closed position, covering an insert open side of said insert (20).

2. A control cabinet in accordance with claim 1, wherein
    said cover (28) has a beveled operating ridge (37) on an outside of said cover (28) along an edge of said cover (28) opposite said hinged side (38).

3. A control cabinet in accordance with claim 1, wherein
    said closure frame (23, 24, 25) has a first section (23) extending perpendicular to said cabinet door (10), connected to a second section (24) extending parallel to said cabinet door (10), and
    said closure frame (23, 24, 25) is closed towards an exterior by means of an inclined third section (25) oriented towards said cabinet door (10), which increases a width of said closure frame (23, 24, 25) in a direction towards said cabinet door (10).

4. A control cabinet in accordance with claim 1, wherein
    said cover (28) is rotatably seated in said closure frame (23, 24, 25), having sides adjoining said hinged side (38) and in a closed position having an end flush with said second section (24) of said closure frame (23, 24, 25) said second section (24) extending parallel to said cabinet door (10).

5. A control cabinet in accordance with claim 1, wherein
    an upper sidewall (21) of said insert (20) is inclined such that said insert (20) becomes larger towards an insert open side and
    a lighting means (34) for illuminating a space above said opened cover (28) is built into said upper sidewall (21).

6. A control cabinet in accordance with claim 5, wherein
    said cover (28) has a beveled operating ridge (37) on an outside of said cover (28) along an edge of said cover (28) opposite said hinged side (27).

7. A control cabinet in accordance with claim 6, wherein
    said closure frame (23, 24, 25) has a first section (23) extending vertically to said cabinet door (10), connected to a second section (25) extending parallel to said cabinet door (10), and
    said closure frame (23, 24, 25) is closed towards an exterior by means of an inclined third section (25) oriented towards said cabinet door (10), which increases a width of said closure frame (23, 24, 25) in a direction towards said cabinet door (10).

8. A control cabinet in accordance with claim 7, wherein
    said cover (28) is rotatably seated in said closure frame (23, 24, 25), having sides adjoining said hinged side (27) and in a closed position having ends flush with said second section (24) of said closure frame (23, 24, 25) said second section (24) extending parallel to said cabinet door (10).

* * * * *